(12) United States Patent
Murata et al.

(10) Patent No.: US 11,714,279 B2
(45) Date of Patent: Aug. 1, 2023

(54) VEHICLE DISPLAY DEVICE

(71) Applicant: Yazaki Corporation, Tokyo (JP)

(72) Inventors: Naohisa Murata, Shizuoka (JP); Haruyoshi Ono, Shizuoka (JP); Yuta Miyake, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/688,785

(22) Filed: Mar. 7, 2022

(65) Prior Publication Data
US 2022/0291505 A1  Sep. 15, 2022

(30) Foreign Application Priority Data

Mar. 9, 2021 (JP) ................... 2021-036796

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *B60K 2370/1529* (2019.05); *B60K 2370/23* (2019.05); *B60K 2370/48* (2019.05); *B60K 2370/52* (2019.05); *B60K 2370/785* (2019.05); *G02B 2027/014* (2013.01); *G02B 2027/0141* (2013.01)

(58) Field of Classification Search
CPC ... G02B 27/01–0189; G02B 2027/0105–0198; B60K 35/00; B60K 2370/00–98
See application file for complete search history.

(56) References Cited

U.S. PATENT DOCUMENTS

| 2014/0132852 | A1  | 5/2014  | Pawusch |
| 2015/0098029 | A1  | 4/2015  | Sato et al. |
| 2021/0364791 | A1* | 11/2021 | Kim ................... G02B 27/0101 |
| 2022/0128859 | A1* | 4/2022  | Takahata ............ G02B 27/0101 |
| 2022/0146818 | A1* | 5/2022  | Inoue ..................... B60K 35/00 |

FOREIGN PATENT DOCUMENTS

| JP | H9-43531 A    | 2/1997  |
| JP | 2013-228442 A | 11/2013 |
| JP | 2015-152746 A | 8/2015  |
| JP | 2021-26097 A  | 2/2021  |

* cited by examiner

*Primary Examiner* — Bao-Luan Q Le
*Assistant Examiner* — Christopher A Lamb, II
(74) *Attorney, Agent, or Firm* — Kenealy Vaidya LLP (57) ABSTRACT

A vehicle display device includes a display that emits a display image to be projected onto a windshield provided to a vehicle, as display light, at least one reflecting mirror that is disposed on an optical path of the display light from the display to the windshield and reflects the display light, an optical sensor that detects external light (SL) incident from an opening through which an outside and an internal space are communicated with each other, a temperature sensor that detects a temperature of the display, a dimming member that is disposed on the optical path of the display light, and a controller that causes the dimming member to be switched between a state with a first transmissivity and a state with a second transmissivity smaller than the first transmissivity.

3 Claims, 8 Drawing Sheets

VEHICLE DISPLAY DEVICE

CROSS-REFERENCE TO RELATED APPLICATION(S)

The present application claims priority to and incorporates by reference the entire contents of Japanese Patent Application No. 2021-036796 filed in Japan on Mar. 9, 2021.

BACKGROUND OF THE INVENTION

1. Field of the Invention

The present invention relates to a vehicle display device.

2. Description of the Related Art

According to the related art, vehicles such as automobiles are equipped with a head-up display (HUD) device. The head-up display device projects a display image to be displayed on a display onto a windshield or a combiner via a reflecting mirror or the like, and then a driver can visually recognize the display image as a virtual image. In the head-up display device, in a case where the display image displayed on the display in a housing is projected onto the windshield disposed outside the housing, an opening is provided on an upper portion of the housing (for example, see Japanese Patent Application Laid-open No. 2013-228442).

Meanwhile, there is room for improvement in response to concerns that in a case where sunlight or the like enters the inside of the housing from the outside via the opening and reaches the display via the reflecting mirror or the like, a temperature of the display rises due to a light condensing action of the reflecting mirror or the like, and the performance and durability of the display deteriorate.

SUMMARY OF THE INVENTION

The present invention has been made in view of the above problems, and an object of the present invention is to provide a vehicle display device that suppresses a temperature rise in a display due to external light.

To achieve the above object, a vehicle display device according to one aspect of the present invention includes a display that emits a display image to be projected onto a projected member provided outside the vehicle display device, as display light; at least one reflecting mirror that is disposed on an optical path of the display light from the display to the projected member and reflects the display light; an irradiation information acquiring unit that acquires irradiation information indicating whether or not the display is irradiated with external light including sunlight; a dimming member disposed on the optical path of the display light; and a dimming controller that switches transmissivity of the dimming member based on the irradiation information acquired by the irradiation information acquiring unit, wherein in a case where the irradiation information indicates that the display is irradiated with the external light, the dimming controller causes the dimming member to be switched from a state with a first transmissivity to a state with a second transmissivity smaller than the first transmissivity.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a vehicle display device according to the present invention will be described in detail with reference to the drawings. The present invention is not limited to the present embodiment. The components in the following embodiment include components that can be easily assumed by those skilled in the art or components that are substantially the same. In addition, the components in the following embodiment can be omitted, replaced, or changed in various ways without departing from the gist of the invention.

Embodiment

Figure 1:
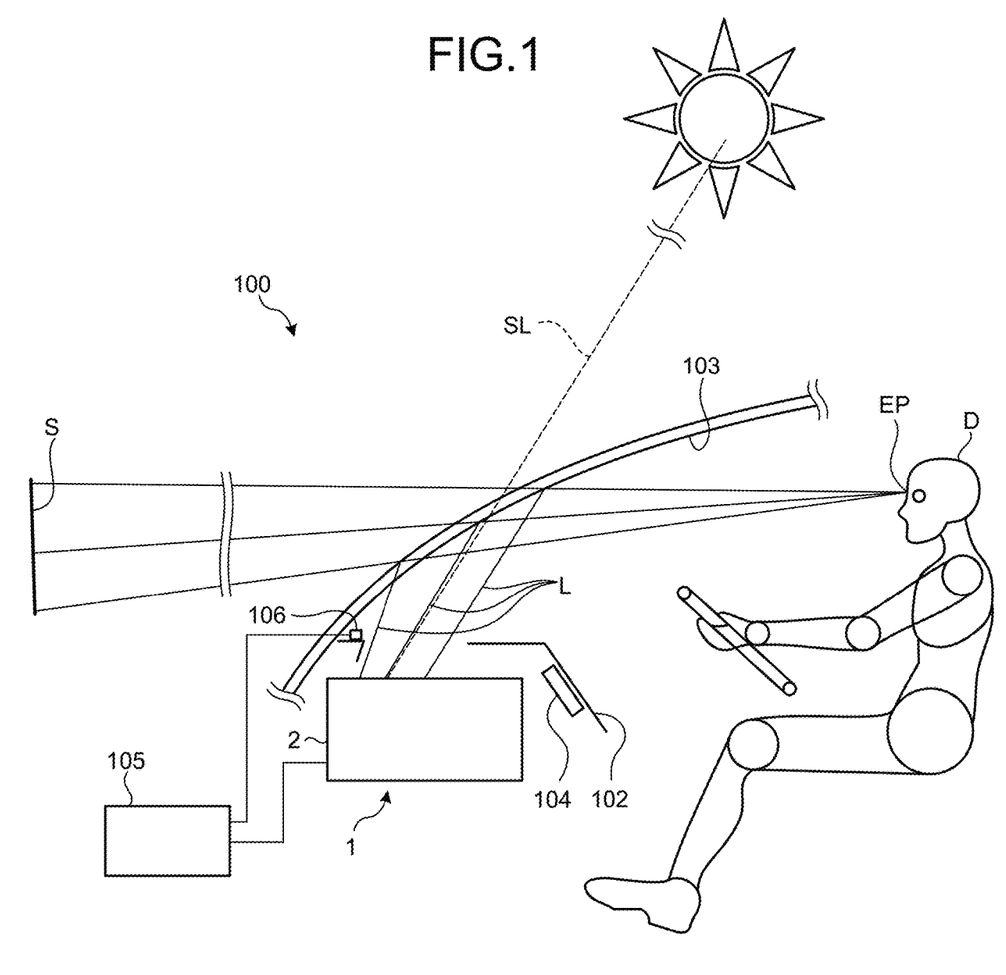
FIG. 1 is a schematic diagram illustrating a schematic configuration of a vehicle in which a vehicle display device according to an embodiment is mounted.
Figure 2:
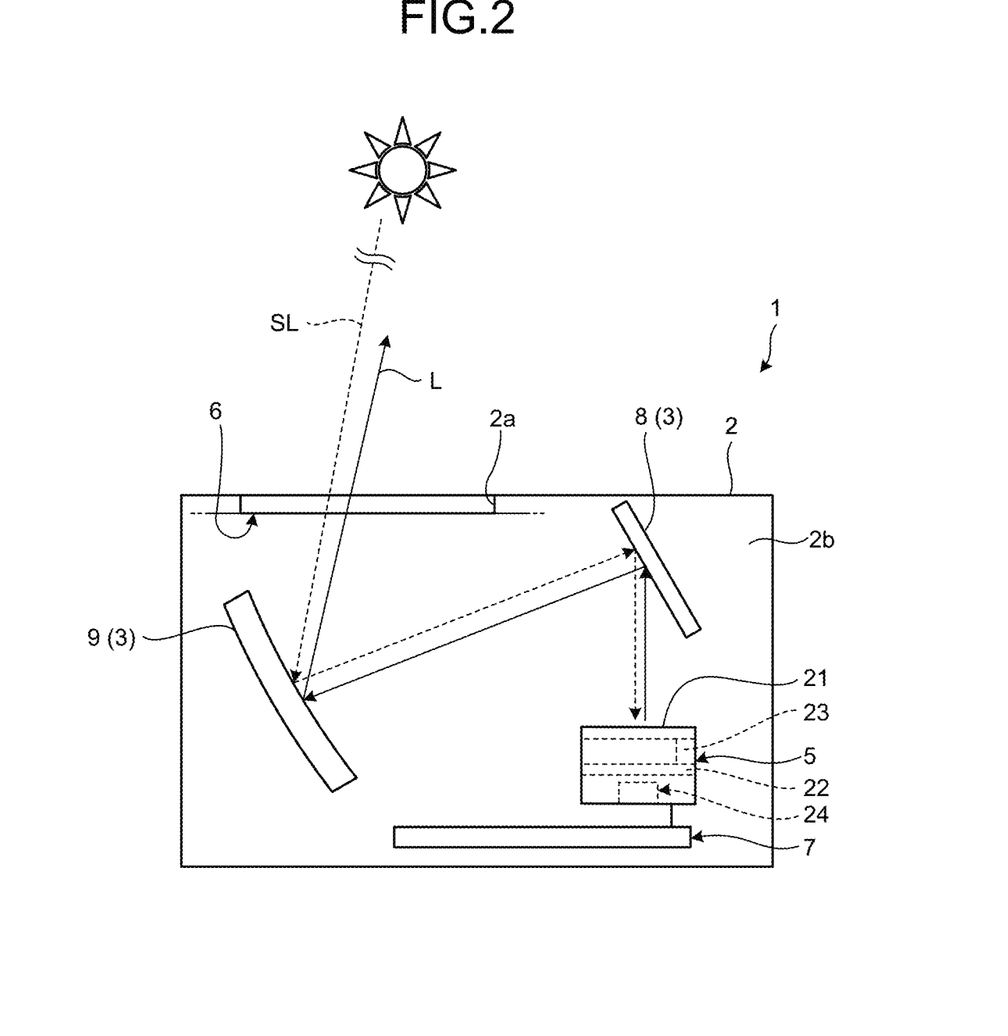
FIG. 2 is a schematic diagram illustrating a schematic configuration of the vehicle display device according to the embodiment.

As illustrated in FIG. 1, a vehicle display device 1 is a head-up display device mounted on a vehicle 100 such as an automobile. The vehicle display device 1 is disposed in the vehicle 100 together with a meter 104 inside an instrument panel 102, and projects a display image onto a windshield 103. The vehicle display device 1 projects the display image onto the windshield 103 that is a projected member to display a virtual image S in front of an eyepoint EP of a driver D. Since the windshield 103 has semi-transmissive properties including a property of reflecting a part of incident light as well as a property of transmitting the other part of the incident light, the windshield 103 reflects the display image projected from the vehicle display device 1 toward the eyepoint EP of the driver D as display light L while transmitting the foreground of the vehicle 100. The windshield 103 is provided outside the vehicle display device 1, and is disposed over the instrument panel 102, for example. The eyepoint EP is preset as a viewpoint position of the driver D. The driver D recognizes the display image reflected by the windshield 103 as the virtual image S. The driver D recognizes that the virtual image S is positioned further to the front than the windshield 103. The vehicle display device 1 is connected to an electronic controller (ECU) 105 in the vehicle 100, and may be driven in response to a control signal from the ECU 105. The ECU 105 is connected to, for example, an illuminance sensor 106 disposed on the instrument panel 102. The vehicle 100 has, for example, an auto light function that automatically turns on or off headlights (not illustrated) depending on the brightness of the surrounding of the vehicle 100. For example, the ECU 105 turns on the headlights in a case of determining that the illuminance in the surrounding is lower than 1000 lux according to a detection result obtained from the illuminance sensor 106, and the ECU 105 turns off the headlights in a case of determining that the illuminance in the surrounding is equal to or higher than 7000 lux. As illustrated in FIG. 2, the vehicle display device 1 of the present embodiment is configured to include a housing 2, two reflecting mirrors 3, a display 5, a dimming member 6, and a controller 7.

The housing 2 is formed by, for example, molding a synthetic resin material into a box shape, and has an internal space 2b therein. As illustrated in FIG. 2, the housing 2 accommodates the display 5, the two reflecting mirrors 3, and the controller 7 described above in the internal space 2b, and supports these components. The housing 2 includes an opening 2a through which an outside of the vehicle display device 1 and the internal space 2b are communicated with each other. The opening 2a is provided in the housing 2 at a position facing the windshield 103. The opening 2a is blocked by the dimming member 6. The vehicle display device 1 of the present embodiment emits the display light L from the housing 2 toward the windshield 103 via the dimming member 6. The display light L is light emitted from the display 5 and reflected by the reflecting mirrors 3.

As illustrated in FIG. 2, the two reflecting mirrors 3 are disposed on an optical path of the display light L from the display 5 to the windshield 103, and reflect the display light L emitted from the display 5 toward the windshield 103. The two reflecting mirrors 3 of the present embodiment are constituted of a plane mirror 8 and a concave mirror 9.

The plane mirror 8 has a reflecting surface formed of a plane and is disposed at a position facing the display 5. The plane mirror 8 totally reflects the display light L emitted from the display 5 on the reflecting surface toward the concave mirror 9.

The concave mirror 9 has a reflecting surface formed of a concave curved surface (or a convex curved surface), and is disposed at a position facing the plane mirror 8. The concave mirror 9 totally reflects the display light L reflected by the plane mirror 8 toward the windshield 103 via the dimming member 6. The concave mirror 9 of the present embodiment has a function as a magnifying mirror. That is, with the concave mirror 9, the displayed image is reflected to be enlarged so that the display image represented by the display light L after reflected by the concave mirror 9 is relatively larger than the display image represented by the display light L before reflected by the concave mirror 9. Here, external light SL is sunlight incident into the housing 2 via the dimming member 6. The external light SL is condensed by being reflected on the concave mirror 9 that functions as a magnifying mirror. Therefore, the external light SL directed toward the display 5 via the concave mirror 9 is condensed light.

The display 5 emits the display image to be projected onto the windshield 103 as the display light L. The display 5 is configured to include a liquid crystal display unit 21, a backlight unit 22, a temperature sensor 23, and an optical sensor 24.

The liquid crystal display unit 21 is a so-called liquid crystal panel, and is formed of, for example, a light transmitting thin film transistor (TFT) liquid crystal display, a light semi-transmitting TFT liquid crystal display, or the like. The liquid crystal display unit 21 is illuminated from the back surface side, thereby a display surface on the front surface side emitting light. The liquid crystal display unit 21 is disposed on the optical path of light emitted from the backlight unit 22, and is illuminated from the back surface side, thereby the display surface on the front surface side emitting light. The liquid crystal display unit 21 has a function of transmitting the external light SL incident through the plane mirror 8. The liquid crystal display unit 21 transmits, for example, the incident external light SL toward the optical sensor 24 without refracting the external light SL.

The backlight unit 22 illuminates the liquid crystal display unit 21 from the back surface side. The backlight unit 22 is disposed to face the plane mirror 8 of the reflecting mirrors 3. The backlight unit 22 is driven by, for example, electric power obtained from a battery (not illustrated) in the vehicle 100.

The temperature sensor 23 is an example of an irradiation information acquiring unit, detects the temperature of the display 5, and is constituted of, for example, a thermistor, a thermocouple, a resistance temperature detector (RTD), an IC temperature sensor, or the like. The temperature sensor 23 is disposed in an internal space of the display 5, and disposed in the vicinity of the liquid crystal display unit 21 or the backlight unit 22. The temperature sensor 23 is electrically connected to the controller 7, and outputs, for example, a detection value (detected temperature) to the controller 7 at regular intervals. The temperature sensor 23 as the irradiation information acquiring unit outputs a detection value as irradiation information to the controller 7.

The optical sensor 24 is an example of the irradiation information acquiring unit, and detects the external light SL that is transmitted through the dimming member 6 from the outside of the housing 2 and incident on the display 5 via the reflecting mirror 3. The optical sensor 24 is disposed on the optical path of the external light SL incident on the display 5 and disposed on the opposite side to the liquid crystal display unit 21, with the backlight unit 22 interposed between the optical sensor 24 and the liquid crystal display unit 21. The optical sensor 24 is formed of, for example, an infrared sensor, and detects light (infrared rays) in the infrared region of the external light SL. Specifically, the optical sensor 24 receives light (infrared rays) in the infrared region of the external light SL, converts the light into an electric signal, and outputs the electric signal to the controller 7 as a detection signal. The optical sensor 24 as the irradiation information acquiring unit outputs the detection signal to the controller 7 as irradiation information in a case where the external light SL has been detected, and the optical sensor 24 does not output the detection signal to the controller 7 in a case where the external light SL is no longer detected.

The dimming member 6 is disposed on the optical path of the display light L, and can electrically change light transmissivity. In a case where a voltage value of an applied voltage is changed, the dimming member 6 can change a state of transmissivity between, for example, the minimum transmissivity and the maximum transmissivity. The minimum transmissivity can be set to 0, for example, but can also be set to any value. The transmissivity of 0% is a non-transmitting state. On the other hand, the maximum transmissivity can be set to 100%, for example, but can be set to any value. The dimming member 6 of the present embodiment can be switched between a state with a first transmissivity and a state with a second transmissivity smaller than the first transmissivity depending on a voltage value applied by the controller 7. The first transmissivity may be the maximum transmissivity or may be any value. The second transmissivity may be the minimum transmissivity or may be any value. The dimming member 6 is formed in a flat plate shape or a film shape, and is disposed at, for example, a position to block the opening 2a. The dimming member 6 can be switched to have any transmissivity in addition to the first transmissivity and the second transmissivity depending on a voltage value applied by the controller 7.

The controller 7 is an example of a dimming controller, and electrically connected to the display 5 to control an operation of the display 5, as illustrated in FIG. 2. The controller 7 switches transmissivity of the dimming member 6 based on a detection result of the external light SL obtained from the optical sensor 24 or a detection value obtained from the temperature sensor 23. The controller 7 is formed of, for example, an IC chip or the like, and is driven by electric power obtained from the battery in the vehicle 100. The controller 7 is electrically connected to the ECU 105 in the vehicle 100, and transmits and receives a signal to and from the ECU 105.

The controller 7 switches transmissivity of the dimming member 6 based on irradiation information indicating whether or not the display 5 is irradiated with the external light SL. For example, in a case where the irradiation information indicates that the display 5 is irradiated with the external light SL, the controller 7 causes the dimming member 6 to be switched from the state with the first transmissivity to the state with the second transmissivity. Specifically, in a case where the external light SL is detected by the optical sensor 24, the controller 7 receives the detection signal as the irradiation information from the optical sensor 24, and causes the dimming member 6 to be switched from the state with the first transmissivity to the state with the second transmissivity. In addition, in a case where the external light SL is no longer detected after the external light SL has been detected by the optical sensor 24, the controller 7 receives no detection signal as the irradiation information from the optical sensor 24, and thus causes the dimming member 6 to be switched from the state with the second transmissivity to the state with the first transmissivity. That is, in a case where the controller 7 no longer receives the detection signal from the optical sensor 24 in a state in which the dimming member 6 has been switched to have the second transmissivity, the controller 7 causes the dimming member 6 to be switched from the state with the second transmissivity to the state with the first transmissivity.

In addition, in a case where the detection value obtained by the temperature sensor 23 is greater than a threshold value, the controller 7 receives the detection value as the irradiation information from the temperature sensor 23, and in a case where the detection value and the threshold value are compared to determine that the detection value is greater than the threshold value, the controller 7 switches transmissivity of the dimming member 6 from the state with the first transmissivity to the state with the second transmissivity. The threshold value may be, for example, a temperature at which the liquid crystal display unit 21 may be damaged (herein, referred to as a limit temperature), or may be any temperature. For example, in a case where the threshold value is 50° C. and the first transmissivity is 100%, the controller 7 switches transmissivity of the dimming member 6 to the second transmissivity of 75%. In a case where the threshold value is 75° C. and the first transmissivity is 100%, the controller 7 switches transmissivity of the dimming member 6 to the second transmissivity of 50%. In a case where the threshold value is equal to or higher than 100° C. and the first transmissivity is 100%, the controller 7 switches transmissivity of the dimming member 6 to the second transmissivity of 0%. In a case where a detection value that is newly detected by the temperature sensor 23 is reduced to be equal to or smaller than the threshold value after the detection value of the temperature sensor 23 becomes greater than the threshold value, the controller 7 causes the dimming member 6 to be switched from the state with the second transmissivity to the state with the first transmissivity. That is, in a case where the controller 7 determines that the new detection value received as the irradiation information from the temperature sensor 23 is equal to or smaller than the threshold value and the dimming member 6 has been switched to the state with the second transmissivity, the controller 7 causes the dimming member 6 to be switched from the state with the second transmissivity to the state with the first transmissivity.

Next, a virtual image display operation in the vehicle display device 1 will be described. First, the display light L emitted from the display 5 is directed toward the plane mirror 8. The display light L incident from the display 5 is reflected by the plane mirror 8 toward the concave mirror 9. The display light L incident from the plane mirror 8 is reflected on a concave reflecting surface of the concave mirror 9 toward the windshield 103 via the dimming member 6. As a result, the display image corresponding to the display light L is projected onto the windshield 103, and the virtual image S is displayed in front of the eyepoint EP of the driver D.

Figure 3A:
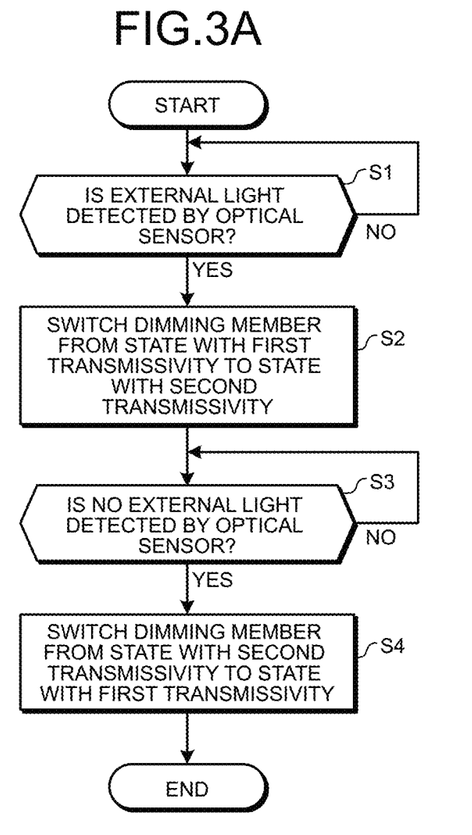
FIGS. 3A and 3B are flowcharts illustrating examples for processing of switching transmissivity of a dimming member executed by a controller according to the embodiment.

Next, a change in the transmissivity state of the dimming member 6 in the vehicle display device 1 will be described with reference to FIGS. 3A and 3B. First, the external light SL that is transmitted through the dimming member 6 and incident on the internal space 2b of the housing 2 is partially or totally reflected by the concave mirror 9 toward the plane mirror 8. A part or total external light SL from the concave mirror 9 is reflected by the plane mirror 8 toward the display 5. The external light SL directed from the plane mirror 8 toward the display 5 is transmitted through the liquid crystal display unit 21 and the backlight unit 22, and is directed toward the optical sensor 24. In FIG. 3A, the controller 7 determines whether or not the external light SL is detected by the optical sensor 24 (Step S1). In a case where the controller 7 determines that the external light SL is detected by the optical sensor 24, the controller 7 causes the dimming member 6 to be switched from the state with the first transmissivity to the state with the second transmissivity (Step S2). On the other hand, in a case where no external light SL is detected by the optical sensor 24, Step S1 is repeated.

Next, after Step S2, the controller 7 determines whether or not the external light SL is no longer detected by the optical sensor 24 (Step S3). In a case where the controller 7 determines that the external light SL is no longer detected by the optical sensor 24, the controller 7 causes the dimming member 6 to be switched from the state with the second transmissivity to the state with the first transmissivity (Step S4), and this processing ends. Although the processing ends after Step S4, the processing may also proceed to Step S1. Since the external light SL directed toward the display 5 via the concave mirror 9 is condensed by the concave mirror 9, the temperature of the display 5 sharply rises in a case where the display 5 is irradiated. Therefore, since the transmissivity of the dimming member 6 is switched from the first transmissivity to the second transmissivity smaller than the first transmissivity, the external light SL emitted to the display 5 via the reflecting mirror 3 is reduced, and as a result, it is possible to suppress a temperature rise in the display 5 due to the external light SL.

Figure 3B:
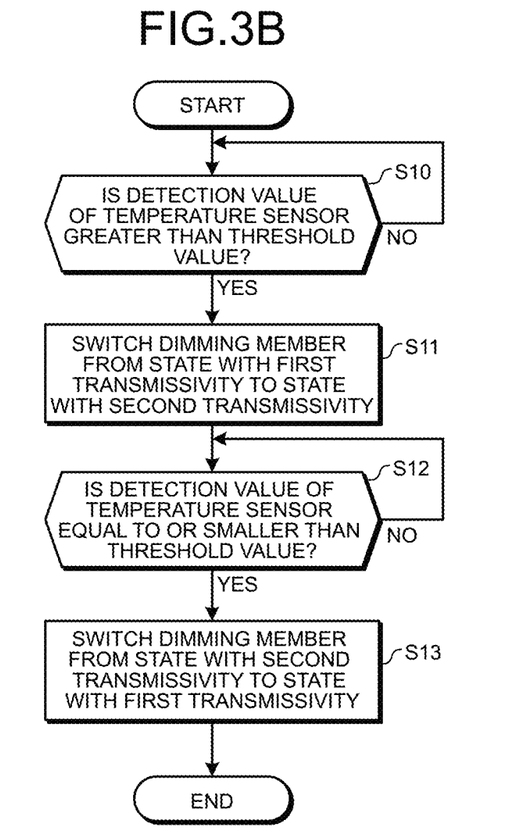

In FIG. 3B, the controller 7 determines whether or not the detection value of the temperature sensor 23 is greater than the threshold value (Step S10). In a case where the controller 7 determines that the detection value of the temperature sensor 23 is greater than the threshold value, the controller 7 causes the dimming member 6 to be switched from the state with the first transmissivity to the state with the second transmissivity (Step S11). On the other hand, in a case where the detection value of the temperature sensor 23 is not greater than the threshold value, Step S10 is repeated. Next, the controller 7 determines whether or not the detection value of the temperature sensor 23 is equal to or smaller than the threshold value after the dimming member 6 is switched from the state with the first transmissivity to the state with the second transmissivity (Step S12). In a case where the controller 7 determines that the detection value of the temperature sensor 23 is equal to or smaller than the threshold value, the controller 7 causes the dimming member 6 to be switched from the state with the second transmissivity to the state with the first transmissivity (Step S13), and this processing ends. Although the processing ends after Step S13, the processing may also proceed to Step S10.

In response to the control of the controller 7, the display 5 is switched between a content display state in which a content 40 is displayed for each of a plurality of display areas 33 subdivided and a content non-display state in which the content 40 is not displayed. Therefore, regarding the virtual image S displayed by the display 5, as illustrated in FIG. 4B and FIG. 5B, the content 40 having a desired shape is displayed in the plurality of connected display areas 33a, and the content 40 is not displayed in a plurality of display areas 33b.

Figure 4A:
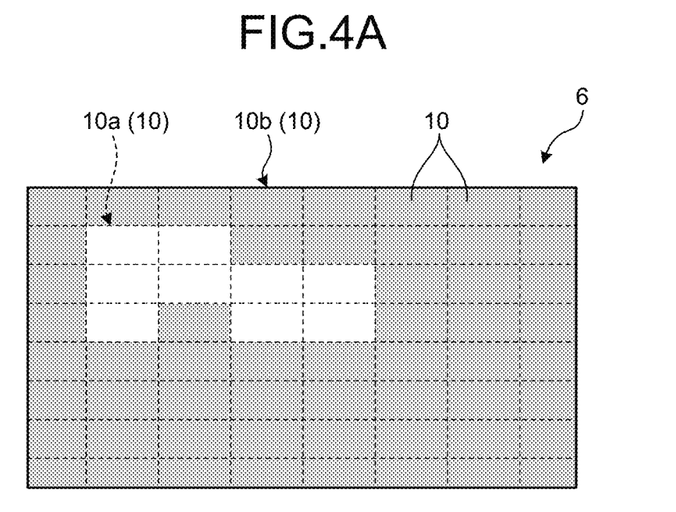
FIG. 4A is a schematic diagram illustrating transmission areas of the dimming member according to the embodiment in a case where no external light is detected.
Figure 4B:
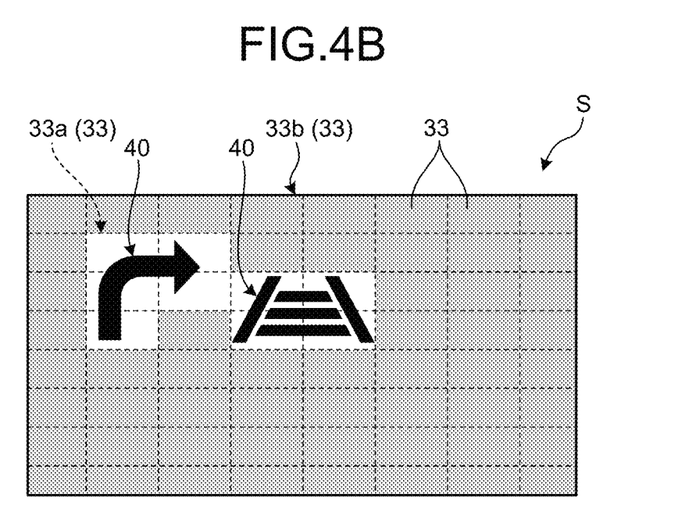
FIG. 4B is a schematic diagram illustrating a display example of a virtual image projected by the vehicle display device in the case where no external light is detected.
Figure 5A:
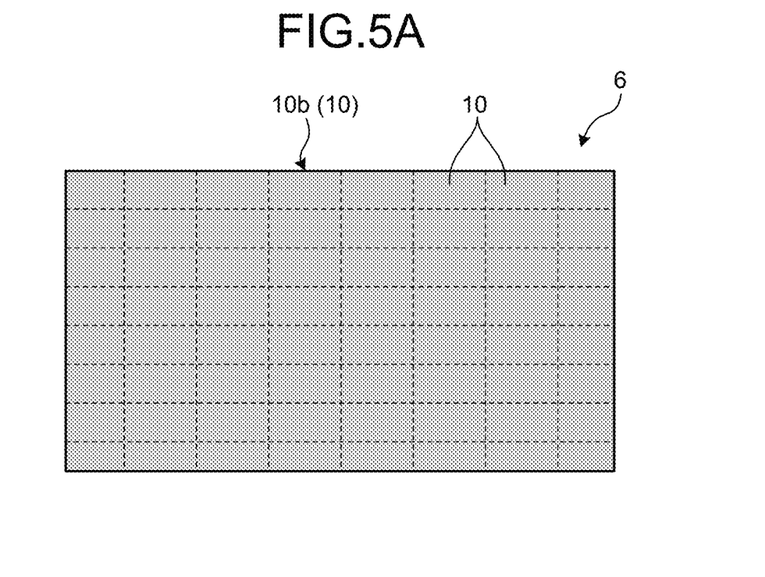
FIG. 5A is a schematic diagram illustrating the transmission areas of the dimming member according to the embodiment in a case where external light is detected.
Figure 5B:
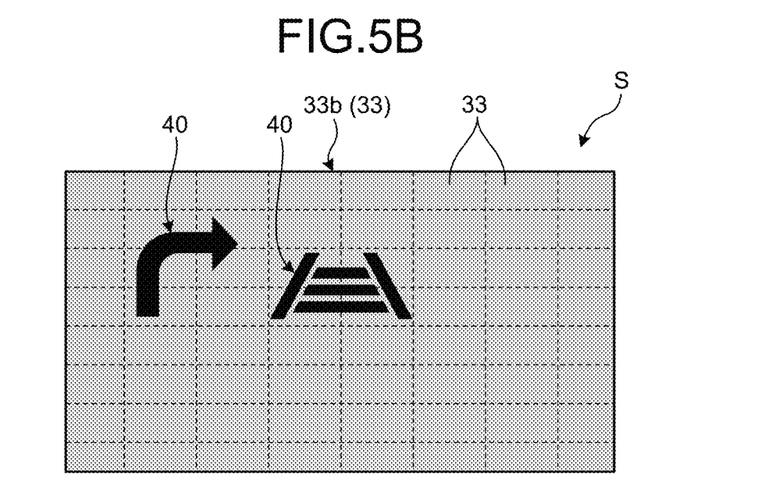
FIG. 5B is a schematic diagram illustrating a display example of a virtual image projected by the vehicle display device in the case where external light is detected.

As illustrated in FIG. 4A and FIG. 5A, in a case where the dimming member 6 is subdivided into a plurality of transmission areas 10 when seen from a transmitting direction of the display light L, the dimming member 6 can be switched between the state with the first transmissivity and the state with the second transmissivity for each transmission area 10. The dimming member 6 can be realized by providing, for example, a plurality of dimming films whose transmissivity can be changed depending on the number of preset transmission areas.

In a case where no external light SL is detected by the optical sensor 24 or a case where the detection value of the temperature sensor 23 is equal to or smaller than the threshold value, the controller 7 maintains areas corresponding to the display areas 33a in the content display state among the transmission areas 10 to be in the state with the first transmissivity, and maintains areas corresponding to the display areas 33b in the content non-display state among the transmission areas 10 to be in the state with the second transmissivity. On the other hand, in a case where the external light SL is detected by the optical sensor 24 or a case where the detection value of the temperature sensor 23 is greater than the threshold value, the controller 7 switches the areas corresponding to the display areas 33a in the content display state among the transmission areas 10 from the state with the first transmissivity to the state with the second transmissivity, and maintains the areas corresponding to the display areas 33b in the content non-display state among the transmission areas 10 to be in the state with the second transmissivity. Specifically, in the case where the external light SL is detected by the optical sensor 24 or the case where the detection value of the temperature sensor 23 is greater than the threshold value, the dimming member 6 is changed from a state in which no external light is detected as illustrated in FIG. 4A to a state in which the external light is detected as illustrated in FIG. 5A. In the case where no external light SL is detected by the optical sensor 24 or the case where the detection value of the temperature sensor 23 is equal to or smaller than the threshold value, the dimming member 6 maintains transmission areas 10a to be in the state with the first transmissivity and maintains transmission areas 10b to be in the state with the second transmissivity. On the other hand, in the case where the optical sensor 24 detects the external light SL or the case where the detection value of the temperature sensor 23 is greater than the threshold value, the virtual image S is changed to be in a state in which the external light is detected as illustrated in FIG. 5B from a state in which no external light is detected as illustrated in FIG. 4B. In the case where no external light SL is detected by the optical sensor 24 or the case where the detection value of the temperature sensor 23 is equal to or smaller than the threshold value, the display areas 33a in the virtual image S are maintained in the state with the first transmissivity, and the display areas 33b in the virtual image S are maintained in the state with the second transmissivity.

The vehicle display device 1 described above includes the display 5 that emits the display image to be projected onto the windshield 103 of the vehicle 100 as the display light L, the dimming member 6 that is disposed on the optical path of the display light L, and the controller 7 that causes the dimming member 6 to be switched between the state with the first transmissivity and the state with the second transmissivity smaller than the first transmissivity based on the irradiation information acquired by the irradiation information acquiring unit. In a case where the acquired irradiation information indicates that the display 5 is irradiated with the external light SL, the controller 7 causes the dimming member 6 to be switched from the state with the first transmissivity to the state with the second transmissivity. For example, in the case where the external light SL is detected by the optical sensor 24, the controller 7 causes the dimming member 6 to be switched from the state with the first transmissivity to the state with the second transmissivity. In addition, in the case where the detection value of the temperature sensor 23 is greater than the threshold value, the controller 7 causes the dimming member 6 to be switched from the state with the first transmissivity to the state with the second transmissivity.

With the above configuration, the transmissivity of the dimming member 6 is decreased to reduce the external light SL that is transmitted through the dimming member 6 and emitted to the display 5, and the temperature rise in the display 5 in the case where the dimming member 6 is in the state with the second transmissivity is suppressed as compared with the case where the dimming member 6 is in the state with the first transmissivity. Therefore, the temperature rise in the display 5 due to the external light SL can be suppressed. In the related art, in a case where the display 5 is turned off or an angle of the reflecting mirror 3 is changed in order to suppress the temperature rise in the display 5 due to the external light SL, the content 40 related to a speed or warning to be displayed may not be temporarily displayed. However, it is possible to suppress the temperature rise in the display 5 while continuing the displaying of the necessary content 40. In addition, in a case where the driving is carried out by a motor or the like in order to change an angle of the reflecting mirror 3, a driving sound may be generated, and the driver D may feel onerous. However, it is possible to suppress the temperature rise in the display 5 without the driver D hearing the driving sound. Furthermore, as compared with the related art, a space required for changing the angle of the reflecting mirror 3 is not necessary, and the device can be miniaturized. In addition, by setting the second transmissivity to the non-transmitting state, the virtual image S can also be non-displayed temporarily, and it is possible to substitute a park position in the related art.

In the vehicle display device 1, in a case where the external light SL is no longer detected by the optical sensor 24 in the state in which the dimming member 6 has been switched to have the second transmissivity, the controller 7 causes the dimming member 6 to be switched from the state with the second transmissivity to the state with the first transmissivity. Alternatively, in a case where the detection value newly detected by the temperature sensor 23 is equal to or smaller than the threshold value in the state in which the dimming member 6 has been switched to have the second transmissivity, the controller 7 causes the dimming member 6 to be switched from the state with the second transmissivity to the state with the first transmissivity. In this way, since the transmissivity of the dimming member 6 is switched depending on the irradiation state of the external light SL and the temperature state of the display 5, the transmissivity of the dimming member 6 is increased in a case where the temperature rise in the display stops, and the deterioration in the visibility of the virtual image S can be suppressed.

In addition, in the vehicle display device 1, in a case where the irradiation information indicates that the display 5 is not irradiated with the external light SL, the controller 7 maintains the areas corresponding to the display areas 33a in the content display state among the transmission areas 10 to be in the state with the first transmissivity, and maintains the areas corresponding to the display areas 33b in the content non-display state among the transmission areas 10 to be in the state with the second transmissivity. On the other hand, in a case where the irradiation information indicates that the display 5 is irradiated with the external light SL, the controller 7 switches the areas corresponding to the display areas 33a in the content display state among the transmission areas 10 from the state with the first transmissivity to the state with the second transmissivity, and maintains the areas corresponding to the display areas 33b in the content non-display state among the transmission areas 10 to be in the state with the second transmissivity. As a result, since the temperature rise in the display 5 due to the external light SL can be suppressed while maintaining the displaying of the necessary content 40, the display 5 is not required to be turned off or dimmed, and it is possible to improve the visibility of the virtual image S.

Modified Examples

The display 5 according to a first modified example of the embodiment includes a content constant display area group 32 constituted of the display areas 33, in which at least a part is constantly maintained in the content display state, and a content temporary display area group 31 constituted of the display areas 33 excluded from the content constant display area group 32, in which at least a part is temporarily maintained in the content display state. The content 40 displayed in display areas 33a in the content temporary display area group 31 includes, for example, an icon for guiding a traveling direction of the vehicle 100, an icon for indicating that there is a pedestrian crossing, and the like. On the other hand, the content 40 displayed in the display areas 33a in the content constant display area group 32 includes, for example, information indicating a speed of the vehicle 100, information indicating a warning, and the like.

Figure 6A:
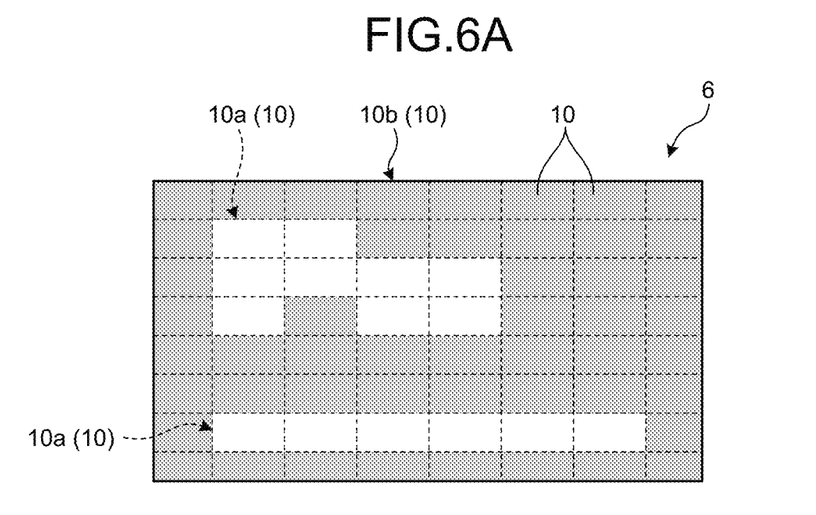
FIG. 6A is a schematic diagram illustrating transmission areas of the dimming member according to a first modified example of the embodiment in a case where no external light is detected.
Figure 6B:
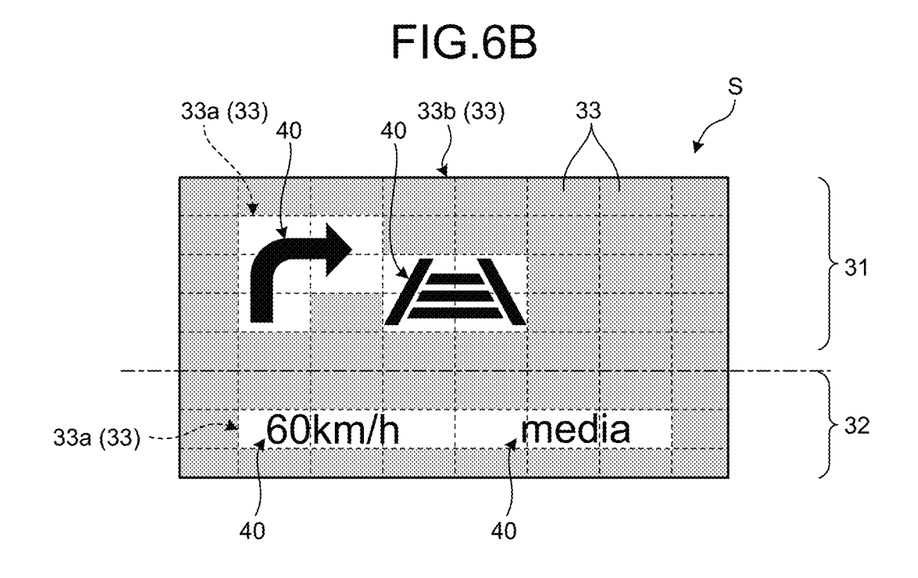
FIG. 6B is a schematic diagram illustrating a display example of a virtual image projected by the vehicle display device according to the first modified example in the case where no external light is detected.
Figure 7A:
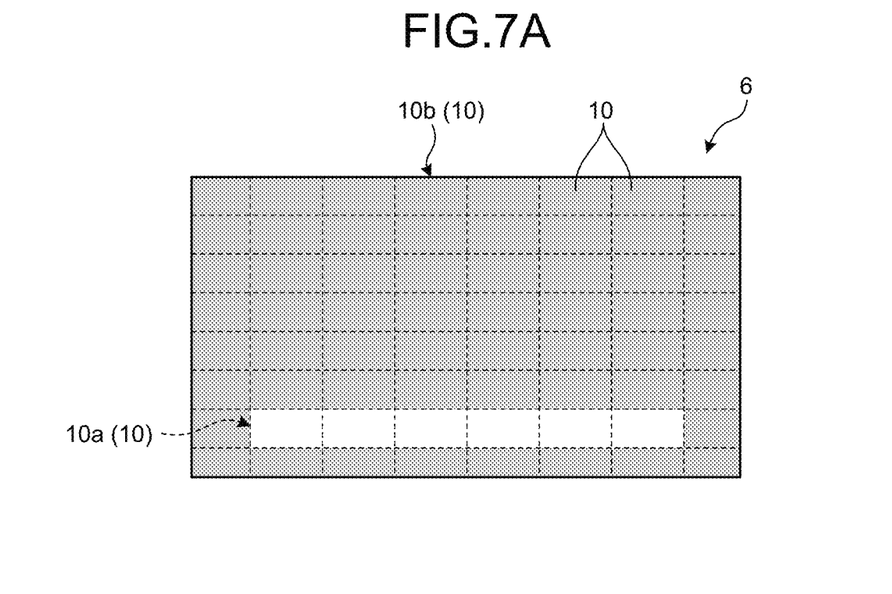
FIG. 7A is a schematic diagram illustrating the transmission areas of the dimming member according to the first modified example of the embodiment in a case where external light is detected.
Figure 7B:
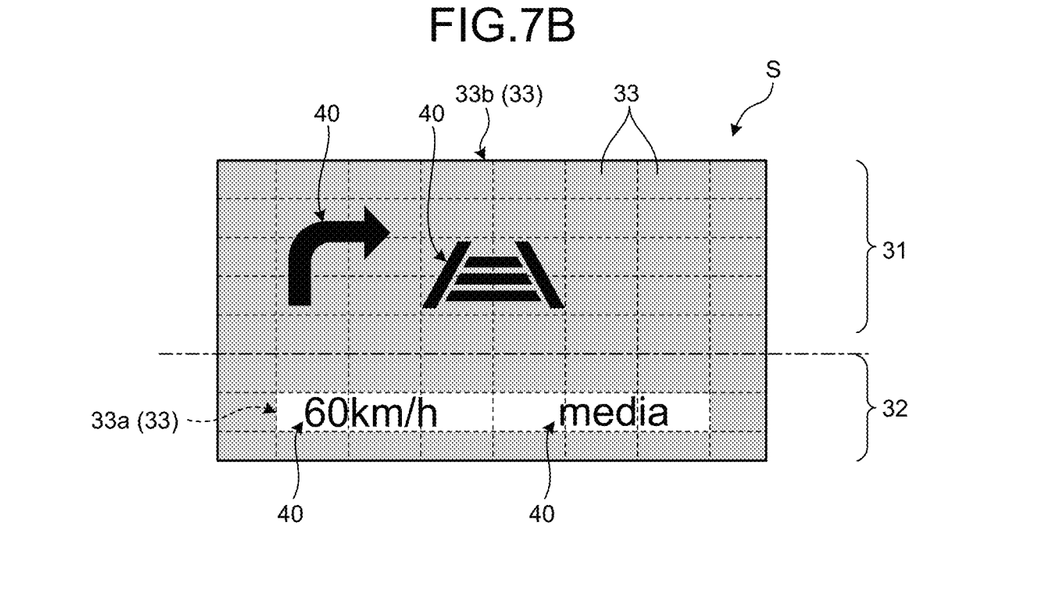
FIG. 7B is a schematic diagram illustrating a display example of a virtual image projected by the vehicle display device according to the first modified example in the case where external light is detected.

In the case where no external light SL is detected by the optical sensor 24 or the case where the detection value of the temperature sensor 23 is equal to or smaller than the threshold value, the controller 7 maintains areas corresponding to the display areas 33a in the content display state in the content constant display area group 32 among the transmission areas 10 to be in the state with the first transmissivity, and maintains areas corresponding to the display areas 33b in the content non-display state in the content constant display area group 32 among the transmission areas 10 to be in the state with the second transmissivity. On the other hand, in a case where the external light SL is detected by the optical sensor 24 or a case where the detection value of the temperature sensor 23 is greater than the threshold value, the controller 7 switches areas corresponding to the display areas 33a in the content display state in the content temporary display area group 31 among the transmission areas 10 from the state with the first transmissivity to the state with the second transmissivity, and maintains areas corresponding to the display areas 33b in the content non-display state in the content temporary display area group 31 among the transmission areas 10 to be in the state with the second transmissivity. Specifically, in the case where the external light SL is detected by the optical sensor 24 or the case where the detection value of the temperature sensor 23 is greater than the threshold value, the dimming member 6 is changed from a state in which no external light is detected as illustrated in FIG. 6A to a state in which the external light is detected as illustrated in FIG. 7A. In the case where no external light SL is detected by the optical sensor 24 or the case where the detection value of the temperature sensor 23 is equal to or smaller than the threshold value, the dimming member 6 maintains transmission areas 10a to be in the state with the first transmissivity and maintains transmission areas 10b to be in the state with the second transmissivity. On the other hand, in the case where the external light SL is detected by the optical sensor 24 or the case where the detection value of the temperature sensor 23 is greater than the threshold value, the virtual image S is changed from a state in which no external light is detected as illustrated in FIG. 6B to a state in which the external light is detected as illustrated in FIG. 7B. In the case where no external light SL is detected by the optical sensor 24 or the case where the detection value of the temperature sensor 23 is equal to or smaller than the threshold value, the display areas 33$a$ in the virtual image S are maintained in the state with the first transmissivity, and the display areas 33$b$ in the virtual image S are maintained in the state with the second transmissivity.

In addition, in the vehicle display device 1 according to the first modified example, the display 5 includes the content constant display area group 32 constituted of the display areas 33, in which at least a part is constantly maintained in the content display state, and the content temporary display area group 31 constituted of the display areas 33 excluded from the content constant display area group 32, in which at least a part is temporarily maintained in the content display state. The dimming member 6 can be switched between the state with the first transmissivity and the state with the second transmissivity for each of the subdivided transmission areas 10. In the case where the irradiation information indicates that the display 5 is not irradiated with the external light SL, the controller 7 maintains the areas corresponding to the display areas 33$a$ in the content display state in the content constant display area group 32 among the transmission areas 10 to be in the state with the first transmissivity, and maintains the areas corresponding to the display areas 33$b$ in the content non-display state in the content constant display area group 32 among the transmission areas 10 to be in the state with the second transmissivity. In the case where the irradiation information indicates that the display 5 is irradiated with the external light SL, the controller 7 switches the areas corresponding to the display areas 33$a$ in the content display state in the content temporary display area group 31 among the transmission areas 10 from the state with the first transmissivity to the state with the second transmissivity, and maintains the areas corresponding to the display areas 33$b$ in the content non-display state in the content temporary display area group 31 among the transmission areas 10 to be in the state with the second transmissivity.

With the above configuration, in the display areas 33$a$ in the content constant display area group 32, which are maintained in the state with the first transmissivity, the visibility of the content 40 can be maintained as compared with the case where the transmissivity is switched from the first transmissivity to the second transmissivity in the state in which the content 40 is displayed. On the other hand, in the display areas 33$a$ in the content temporary display area group 31, in which the transmissivity is switched from the state with the first transmissivity to the state with the second transmissivity, the temperature rise in the display 5 can be suppressed as compared with the case where the state with the first transmissivity is maintained. Accordingly, it is possible to suppress the temperature rise in the display 5 while maintaining the visibility of the content 40. Since the transmissivity state of the dimming member 6 is different between the display areas 33$a$ and the display areas 33$b$, the contrast between the areas is clear. In a case where the dimming member 6 can be switched between the state with the first transmissivity and the state with the second transmissivity for each of the subdivided transmission areas 10, the state of the transmissivity can be quickly switched depending on the change in the display state of the content 40.

Figure 8:
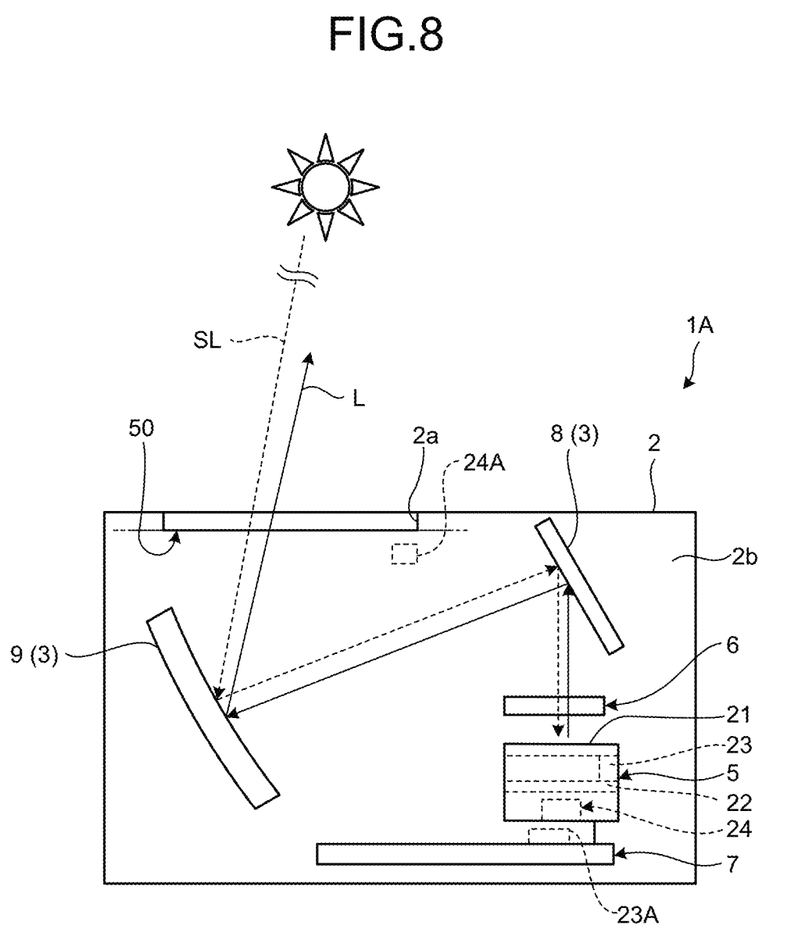
FIG. 8 is a schematic diagram illustrating a schematic configuration of the vehicle display device according to a second modified example of the embodiment.

FIG. 8 is a schematic diagram illustrating a schematic configuration of the vehicle display device according to a second modified example of the embodiment. As illustrated in FIG. 8, in a vehicle display device 1A according to the modified example, the dimming member 6 is disposed at a position different from the vehicle display device 1.

In the vehicle display device 1A, the dimming member 6 is disposed on the optical path of the display light L and between the reflecting mirror 3 and the display 5. The opening 2$a$ is blocked with a transparent cover 50 that transmits the display light L. The transparent cover 50 blocks the opening 2$a$ to prevent dust and the like from entering the housing 2 from the outside. As illustrated in the figure, the dimming member 6 may be disposed apart from the display 5 or may be disposed in contact with the display 5. As a result, the size of the dimming member 6 in a plane direction orthogonal to a thickness direction can be reduced. Since the size of each transmission area of the dimming member 6 and the size of a display screen of the display 5 can be made substantially the same, the design for a display position of the content can be easier than the case where the dimming member 6 is disposed on the opening 2$a$.

As another modified example of the above embodiment, a configuration in which a position of the sun is estimated based on position information and direction information received from the global positioning system (GPS) satellite, and the temperature rise in the display 5 and the like due to the irradiation with the external light SL is estimated based on the estimated position of the sun may be adopted. For example, the ECU 105 functions as an example of the irradiation information acquiring unit, and acquires position information and the like obtained from the GPS satellite as the irradiation information. The controller 7 switches transmissivity of the dimming member 6 based on the irradiation information acquired by the ECU 105. In the case of the other modified example described above, the ECU 105 functions as the example of the irradiation information acquiring unit, but the present invention is not limited thereto, and the controller 7 may function as an example of the irradiation information acquiring unit.

In the embodiment and the modified examples described above, the display 5 employs a liquid crystal system, but other systems, for example, a laser system, a digital light processing (DLP) system, and a projector system may be employed.

In the embodiment and the modified examples described above, the temperature sensor 23 is disposed inside the display 5, but the present invention is not limited thereto, and the temperature sensor 23 may be disposed on the internal space 2$b$ of the housing 2 and the outside of the display 5. For example, as illustrated in FIG. 8, the temperature sensor 23A may be disposed on a substrate constituting the controller 7. In addition, the temperature sensors 23 each may be disposed at a plurality of positions. For example, a configuration in which the temperature sensor 23 is disposed inside the display 5, and a temperature sensor 23A is disposed on the internal space 2$b$ of the housing 2 and the outside of the display 5 may be adopted.

In addition, in the embodiment and the modified examples described above, the temperature sensor 23 directly outputs the detection value to the controller 7, but the present invention is not limited thereto. For example, the temperature sensor 23 may be configured to output the detection value to the controller 7 via the meter 104 or the ECU 105 in the vehicle 100.

In the embodiment and the modified examples described above, the optical sensor 24 is disposed inside the display 5, but the present invention is not limited thereto, and the optical sensor 24 may be disposed on the internal space 2$b$ of the housing 2 and the outside of the display 5. For example, as illustrated in FIG. 8, the optical sensor 24A may be disposed around the transparent cover 50 and at a position where the external light SL can be detected. In addition, the optical sensors 24 each may be disposed at a plurality of positions. For example, a configuration in which the optical sensor 24 is disposed inside the display 5, and an optical sensor 24A is disposed on the internal space 2b of the housing 2 and the outside of the display 5 may be adopted.

In the embodiment and the modified examples described above, the optical sensor 24 is an infrared sensor, but may be an illuminance sensor, for example, as long as the sensor can detect the external light SL. In the case where the optical sensor 24 is an illuminance sensor, the optical sensor 24 receives light (visible rays) in the visible region of the external light SL, converts the light into an electric signal, and outputs the electric signal to the controller 7. As the optical sensor 24, either one of the infrared sensor or the illuminance sensor may be disposed, or both the infrared sensor and the illuminance sensor may be disposed.

In the embodiment and the modified examples described above, the dimming member 6 is disposed at a position to block the opening 2a, or disposed on the optical path of the display light L and between the reflecting mirror 3 and the display 5, but the present invention is not limited thereto. The above description may be applied to the plane mirror 8. In this case, the reflectance is switched instead of the transmissivity.

In the embodiment and the modified examples described above, the temperature sensors 23 and 23A and the optical sensors 24 and 24A disposed inside the vehicle display device 1 have been described as the irradiation information acquiring unit, but the present invention is not limited thereto. For example, the irradiation information acquiring unit may be the illuminance sensor 106 mounted on the vehicle 100. In this case, the controller 7 receives a detection signal from the illuminance sensor 106 via the ECU 105, and the controller 7 is configured to switch the transmissivity of the dimming member 6 based on the detection signal (irradiation information). For example, the irradiation information acquiring unit may be a room temperature sensor (not illustrated) mounted on the vehicle 100. In this case, the controller 7 receives a detection value from the room temperature sensor via the ECU 105, and the controller 7 is configured to switch the transmissivity of the dimming member 6 based on the detection value (irradiation information). As the irradiation information acquiring unit, the temperature sensors 23 and 23A disposed inside the vehicle display device 1 and the illuminance sensor 106 mounted on the vehicle 100 may be used in combination, or the room temperature sensor mounted on the vehicle 100 and the optical sensors 24 and 24A disposed inside the vehicle display device 1 may be used in combination. In addition, the room temperature sensor mounted on the vehicle 100 and the illuminance sensor 106 mounted on the vehicle 100 may be used in combination.

In the vehicle display devices 1 and 1A according to the embodiment and the modified examples described above, the controller 7 switches the transmittance state depending on whether or not the irradiation information indicates that the display 5 is irradiated with the external light SL, and a configuration in which the controller 7 switches the transmittance state depending on whether or not the irradiation information is received may be adopted.

The vehicle display devices 1 and 1A according to the embodiment and the modified examples described above include both the temperature sensor 23 and the optical sensor 24, but either one may be used. In addition, the controller 7 may be configured to switch the transmittance state with giving priority to the detection result obtained from the optical sensor 24.

In the embodiment and the modified examples described above, the vehicle display devices 1 and 1A have the two reflecting mirrors 3, but the present invention is not limited thereto, and one reflecting mirror 3 may be used or three or more reflecting mirrors 3 may be used. The plane mirror 8 may be a concave mirror, and for example, a convex mirror, an aspherical mirror, a spherical mirror, a free curved mirror, or the like may be used. As the concave mirror 9, for example, a convex mirror, an aspherical mirror, a spherical mirror, a free curved mirror, or the like may be used. In addition, the concave mirror 9 has a function as a magnifying mirror, but the present invention is not limited thereto, and the concave mirror 9 may have a function as a correction mirror.

In the embodiment and the modified examples described above, each of the vehicle display devices 1 and 1A projects the display image onto the windshield 103 of the vehicle 100, but the present invention is not limited thereto, and the display image may be projected onto, for example, a combiner or the like.

In the embodiment and the modified examples described above, the vehicle display devices 1 and 1A are applied to the vehicle 100 such as an automobile, but the present invention is not limited thereto, and the vehicle display devices 1 and 1A may be applied to, for example, a ship or an aircraft in addition to the vehicle 100.

The vehicle display device according to the present embodiment has an effect that suppresses the temperature rise in the display device due to the external light.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
    a display that emits a display image to be projected onto a projected member provided outside the vehicle display device, as display light;
    at least one reflecting mirror that is disposed on an optical path of the display light from the display to the projected member and reflects the display light;
    an irradiation information acquiring unit that acquires irradiation information indicating whether or not the display is irradiated with external light including sunlight;
    a dimming member disposed on the optical path of the display light; and
    a dimming controller that switches transmissivity of the dimming member based on the irradiation information acquired by the irradiation information acquiring unit, wherein
    in a case where the irradiation information indicates that the display is irradiated with the external light, the dimming controller causes the dimming member to be switched from a state with a first transmissivity to a state with a second transmissivity smaller than the first transmissivity,
    the display is switched between a content display state in which a content is displayed for each of a plurality of display areas subdivided and a content non-display state in which the content is not displayed, and has a content constant display area group constituted of the display areas, in which at least a part is constantly maintained in the content display state, and a content temporary display area group constituted of the display areas excluded from the content constant display area group, in which at least a part is temporarily maintained in the content display state, the dimming member is able to be switched between the state with the first transmissivity and the state with the second transmissivity for each of a plurality of transmission areas subdivided, in a case where the irradiation information indicates that the display is not irradiated with the external light, the dimming controller causes an area corresponding to each display area in the content display state in the content constant display area group among the transmission areas to be maintained in the state with the first transmissivity and causes an area corresponding to each display area in the content non-display state in the content constant display area group among the transmission areas to be maintained in the state with the second transmissivity, and in a case where the irradiation information indicates that the display is irradiated with the external light, the dimming controller causes an area corresponding to each display area in the content display state in the content temporary display area group among the transmission areas to be switched from the state with the first transmissivity to the state with the second transmissivity and causes an area corresponding to each display area in the content non-display state in the content temporary display area group among the transmission areas to be maintained in the state with the second transmissivity.

2. The vehicle display device according to claim 1, wherein the irradiation information acquiring unit is an optical sensor that is disposed inside or outside the display and detects incident external light, in a case where the external light is detected by the optical sensor, the dimming controller causes the dimming member to be switched from the state with the first transmissivity to the state with the second transmissivity, and in a case where the external light is no longer detected after the external light is detected by the optical sensor, the dimming controller causes the dimming member to be switched from the state with the second transmissivity to the state with the first transmissivity.

3. The vehicle display device according to claim 1, wherein the irradiation information acquiring unit is a temperature sensor that is disposed inside or outside the display and detects a temperature of the display, in a case where a detection value of the temperature sensor is greater than a threshold value, the dimming controller causes the dimming member to be switched from the state with the first transmissivity to the state with the second transmissivity, and in a case where a detection value that is newly detected by the temperature sensor is reduced to be equal to or smaller than the threshold value after the detection value of the temperature sensor becomes greater than the threshold value, the dimming controller causes the dimming member to be switched from the state with the second transmissivity to the state with the first transmissivity.

* * * * *